J. R. ODEN.
LOCK NUT.
APPLICATION FILED OCT. 12, 1911.
1,025,825. Patented May 7, 1912.
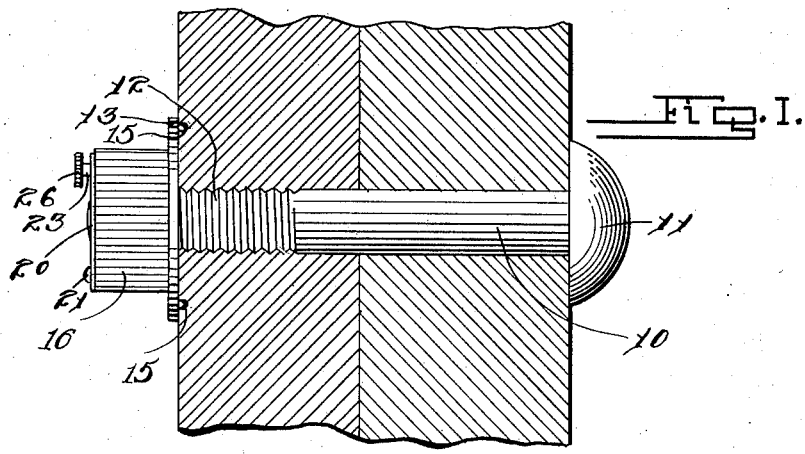
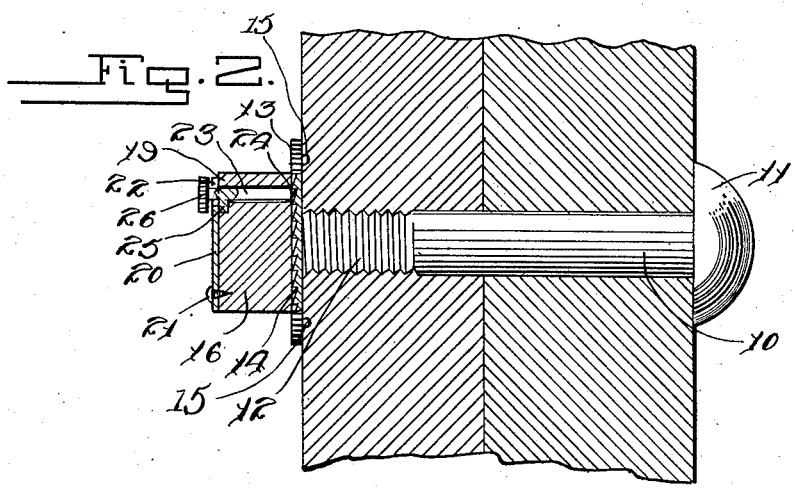
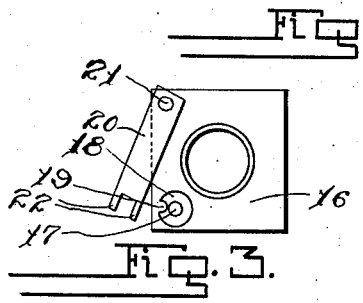
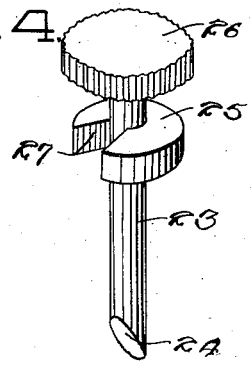
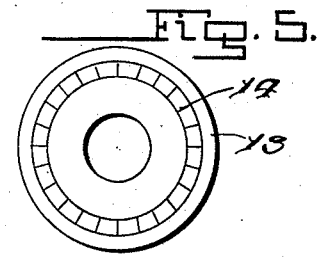
WITNESSES
James R. Oden.
INVENTOR

UNITED STATES PATENT OFFICE.

JAMES R. ODEN, OF BLUE RIDGE, TEXAS.

LOCK-NUT.

1,025,825.

Specification of Letters Patent.

Patented May 7, 1912.

Application filed October 12, 1911. Serial No. 654,272.

*To all whom it may concern:*

Be it known that I, JAMES R. ODEN, a citizen of the United States, residing at Blue Ridge, in the county of Collin and State of Texas, have invented certain new and useful Improvements in Lock-Nuts, of which the following is a specification, reference being had therein to the accompanying drawing.

This invention relates to nut locks and the principal object of the same is to provide a nut lock with a securing pin which engages the teeth formed in a washer and which is held in place by a spring engaging a shoulder formed upon the outer portion of the pin. This shoulder is provided with a notch in which a tongue fits and prevents the rotation of the pin and also forms a support upon which the shoulder rests when the pin is raised so as to permit the nut to be removed.

This invention is illustrated in the accompanying drawings, wherein:

Figure 1 is a side elevation of a bolt having the improved nut lock applied thereto. Fig. 2 is a view showing the bolt in side elevation and the nut in section to show the manner of mounting the pin. Fig. 3 is a plan view of the nut with the pin removed and the spring turned to one side. Fig. 4 is an enlarged perspective view of the pin. Fig. 5 is a plan view of the washer.

Referring to the accompanying drawings by numerals it will be seen that the invention comprises a bolt 10 which has a head 11 at one end and a threaded portion 12 at the opposite end, and a washer 13 is mounted upon the threaded end of the bolt and is provided with a number of teeth 14 which extend in a circular track around the outer face of the washer. The inner face of the washer is provided with lugs 15 which engage the device through which the bolt passes and prevents the washer from slipping. A nut 16 is mounted upon the threaded end of the bolt and is provided with an opening 17 in one corner which registers with the teeth 14 formed in the washer. The opening 17 has an enlarged outer portion 18 which forms a seat and has a tongue 19 extending across one portion of the seat. A spring 20 is secured to the nut by means of the screw 21 and is provided with arms 22 at its free end which extend across the seat 18 to each side of the opening 17. A locking pin 23 extends through the opening 17 and is provided with a beveled end 24 which engages the teeth 14. This end is beveled so that the pin may ride out of the teeth when the nut is being screwed upon the bolt but will prevent the nut from working loose after it has been tightened. A shoulder 25 is formed near the head 26 and is provided with a notch 27 in one portion which receives the tongue 19 when the pin is inserted in the opening 17 and the shoulder rests in the seat 18. The arms 22 of the spring 20 rest upon the outer face of the shoulder 25 and normally hold the shoulder 25 within the seat 18 so that the inner end of the pin will engage the teeth 14 after the nut has been applied to the bolt and screwed tight. The pin 23 prevents the nut from working loose but when it is desired to remove the nut the head 26 is grasped and the pin drawn outwardly, and then turned slightly so that the shoulder 25 rests upon the tongue 19 thus holding the pin out of engagement with the teeth 14. The nut can now be easily removed and it is readily seen that the locking parts of the nut are not injured when removed and that the nut may be used again without it being necessary to repair the same.

What I claim is:—

1. A nut lock comprising a bolt, a washer having teeth formed therein, a nut provided with an opening registering with said teeth and provided with an enlarged outer end portion forming a seat having a tongue formed in one portion thereof, a pin mounted in said opening and provided with a shoulder fitting in said seat and having a notch into which said tongue fits, and a spring secured to said nut and engaging said shoulder to normally hold said pin in engagement with said teeth.

2. In a nut lock, a nut provided with an opening having an enlarged outer end portion forming a seat, a tongue extending across one portion of said seat, a pin fitting in said opening, a shoulder portion formed upon said pin and fitting in said seat, and provided with a notch in which said tongue fits, and a spring secured to said nut and having its free end provided with arms engaging said shoulder to hold said pin within said opening.

In testimony whereof I hereunto affix my signature in presence of two witnesses.

JAS. R. ODEN.

Witnesses:
 H. W. CARSON,
 A. GRIFFITH.

Copies of this patent may be obtained for five cents each, by addressing the "Commissioner of Patents, Washington, D. C."